May 17, 1932. W. NEURATH 1,858,934

TRANSMISSION GEAR

Filed Sept. 10, 1930  2 Sheets-Sheet 1

W. Neurath INVENTOR

By Marks & Clerk ATTYS

May 17, 1932. W. NEURATH 1,858,934

TRANSMISSION GEAR

Filed Sept. 10, 1930 2 Sheets-Sheet 2

W. Neurath
INVENTOR

By: Marks & Clerk
Attys.

Patented May 17, 1932

1,858,934

UNITED STATES PATENT OFFICE

WERNER NEURATH, OF VIENNA, AUSTRIA

TRANSMISSION GEAR

Application filed September 10, 1930, Serial No. 481,004, and in Austria October 1, 1929.

This invention relates to gears with gradually changeable ratio of the type in which a rotary movement is transformed by means of crank gears into multiple reciprocating movements the phases of which are displaced in relation to each other and from which the resulting rotary movement is derived. The resulting rotary movement is obtained by superposing the individual phases of the reciprocating movements and the angular velocity of this movement may be changed by altering the eccentricity of the crank-gears.

According to the present invention a resulting rotary movement of perfect uniformity is obtained in a simple manner, only two reciprocating systems displaced at 90° being required. For this purpose a periodically varying angular velocity is imparted to the driving shaft, one variation taking place within the angle of phase displacement. In the case of two phases displaced at 90° the angular velocity of the driving shaft will therefore have to oscillate four times per revolution. Such a movement may be produced in a simple manner by taking the drive for the driving shaft, from which the reciprocating movements are derived from a jack-shaft at a ratio of 1:4, the angular velocity of the jack-shaft varying once per revolution. Each reciprocating system comprises a rack engaging in two toothed wheels, which through the intermediary of free-wheel devices drive two axles, which are connected so as to revolve in opposite directions. Thus in a simple manner the intermittent alternating rotary movement is transformed into a continuous rotary movement of the driven shaft in one direction only.

The invention relates further to a device, by means of which the ratio of the gear, that is to say the eccentricity of the crank-gears, may be altered in simple manner even while the gear is in operation. For this purpose the radially adjustable crank pins engage in plane threadings provided on plates disposed concentrically with the driving shaft. By turning these plates relatively to the driving axle the crank pins are displaced radially. This relative rotation may be effected by means of mechanisms to be described hereafter.

In the drawings a preferred form of construction for a gear according to the invention is shown by way of example.

Figure 4:
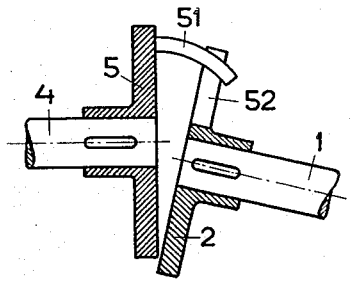
Figure 5:
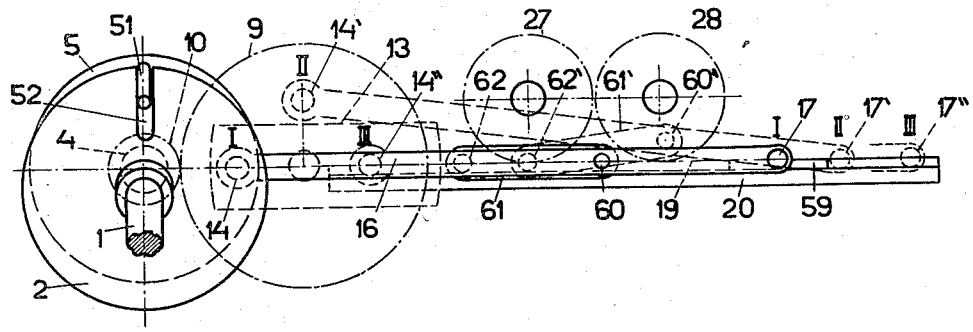

In Figs. 4 and 5 a modification of the driving mechanism is shown in longitudinal section and in elevation respectively. Fig. 5 shows moreover a modification of the crank-gear.

Figure 6:
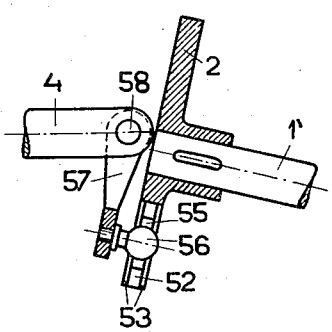

Fig. 6 is a longitudinal section of a further modification of the driving mechanism.

Figure 1:
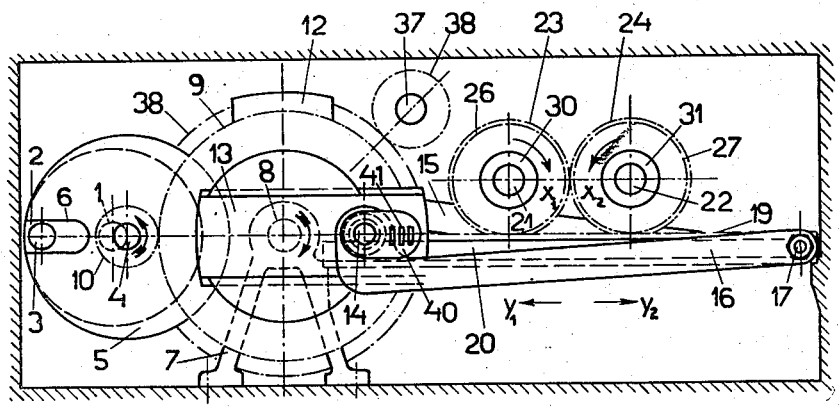
Figs. 1 and 2 are an elevation and a plan view respectively, partly in section.
Figure 2:
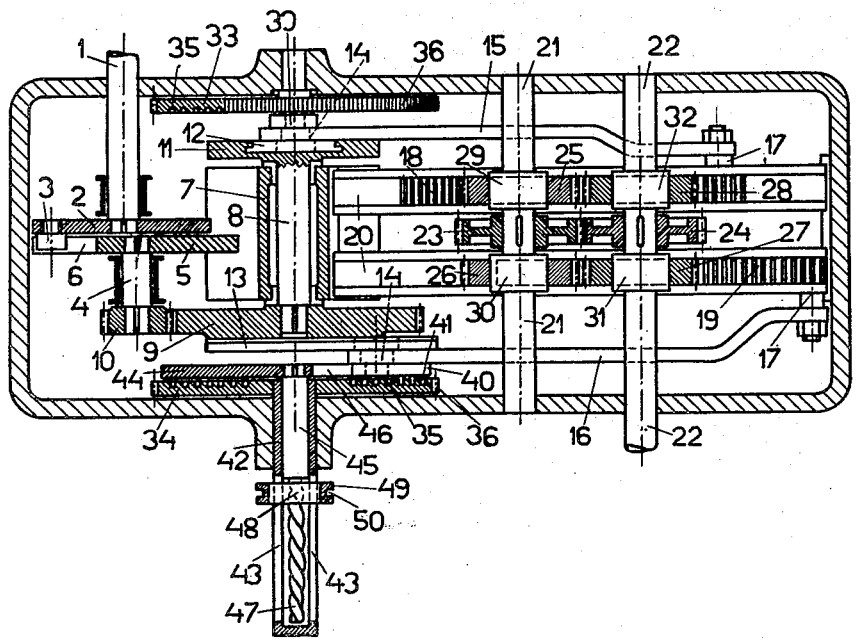

Referring to Figs. 1 and 2 a plate 2 provided with a crank pin 3 is keyed upon the motor shaft 1. A plate 5 is keyed upon a jack-shaft 4 mounted eccentrically to the motor shaft, and is provided with a radial slot 6, in which the crank pin 3 engages. Upon the driving shaft 8, which is mounted in the bearing block 7, there is rigidly mounted a toothed wheel 9, which is driven by the pinion 10 mounted upon the jack-shaft. The driving shaft 8 terminates at one end in a plate 11, in the radial groove of which the crank arm 12 is adapted to slide. In the wheel 9 there is provided at an angle of 90° to the first a similar groove, in which a second crank arm 13 slidingly engages. Connecting rods 15 and 16 are fitted upon the crank pins 14 secured to the crank arms 12, 13. The other ends of the connecting rods are articulated to racks 18, 19 by means of the bolts 17. The racks are guided horizontally in channels 20.

Two shafts 21, 22 are disposed above the racks and coupled by a pair of pinions 23, 24 so as to rotate in opposite directions. Four loose gears 25, 26, 27, 28 are mounted two upon each of the shafts and coupled with them by means of free-wheel devices denoted by 29, 30 and 31, 32 respectively. The free-wheel devices 29, 30 mounted upon the shaft 21 drive the latter for instance in a clockwise direction only (arrow $x_1$), whereas the free-wheel devices 31, 32 mounted upon the shaft 22 drive the same in the opposite direction $x_2$. The gears 26, 27 engage in the rack 19, and the gears 25, 28 in the rack 18. Two plates 33, 34 concentrically disposed to the driving shaft 8 are rotatably mounted within the casing. Upon their inner surfaces these plates are provided with spiral plane threadings 35 and on their peripheral surface with spur teeth 36, in which two pinions 38 keyed upon a common axle 37 engage, both plates being thus joined so as to rotate in unison. Plates 39, 40 are fitted upon the lengthened crank pins 14 and are provided with toothed segments 41 engaging in the plane or crown threading. By the turning of the plates 33, 34 relatively to the driving shaft 8 the crank pins 14 together with the crank arm 12, 13 are adjusted uniformly in a radial direction.

The plate 34 is mounted upon a hollow shaft 42 having two diametrically opposed longitudinal slots 43. A second plate 44 is arranged adjacent the plate 34 and secured to a shaft 45 mounted within the hollow shaft. The plate 44 is provided with a radial slot 46, in which the plate 40 fitted upon the crank pin 14 is radially slidable. The shaft 45 terminates in a steep thread 47, upon which a nut 48 is mounted. This nut projects through the slots 43 and is thus guided longitudinally along the hollow shaft 42. A sleeve 49 surrounding the hollow shaft 42 is connected to the nut 48 and provided with an annular groove 50. By means of a forked lever (not shown in the drawings) engaging in the groove 50 the nut 48 may be shifted in an axial direction even while the gear is in operation, so that the plates 33, 34 are turned relatively to the driving shaft 8, thereby altering the eccentricity of the crank gear and the resulting angular velocity.

In order to explain the mode of working of the gear, let it be first assumed, that the driving shaft 8 rotates with constant angular velocity. In consequence of the action of the crank gear the rack 18 performs a reciprocating movement the momentary velocity of which in a time velocity diagram, if the limited length of the connecting rod be ignored, is represented by a sinus line (Fig. 3b, curve I), the positive parts of which correspond to the strokes of the rack in the direction of the arrow $y_2$, and the negative parts to the strokes in the direction $y_1$. This curve at the same time represents the variation in velocity of the pinions 25, 28. Since the pinion 28 drives the shaft 22 in the direction $x_2$ only, and the pinion 25 the shaft 21 in the direction $x_1$ only, the strokes $y_2$ (parts I of the curve) are transmitted immediately to the shaft 22, while the strokes $y_1$ (parts I' of the curve) are transmitted to the shaft 22 by means of the shaft 21 and the pair of pinions 23, 24. The second reciprocating system comprising the rack 19 and the pinions 26, 27, which is 90° in advance of the first system, shows exactly the same mode of working and, if this second system alone existed the shafts 21, 22 would rotate with velocities given by the curves II, II', but displaced 90° in phase as against the curves I, I'. Since now practically both systems are working simultaneously the shafts 21, 22 acquire the resulting velocity given by the thick wavy line in Fig. 3b.

Figure 3:
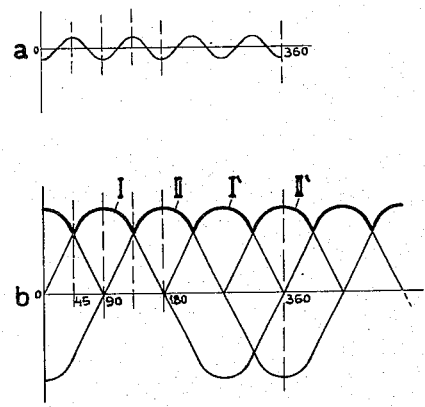
Fig. 3 shows diagrammatically the variations of the angular velocities in the gear.

The resulting curve shown in Fig. 3b still shows considerable irregularity which is eliminated as follows: In consequence of the eccentricity of the jack shaft 4 in regard to the motor shaft 1 there is imparted to the jack shaft a regularly varying angular velocity, one variation taking place during each revolution. The ratio of the jack shaft 4 to the driving shaft 8 is 1:4. The angular velocity of the latter will therefore vary four times per revolution (Fig. 3a), the arrangement being such that the angular velocity of the driving shaft is at its maximum, when the crank radii are inclined at 45° to the level, and its minimum, if the crank radii are at 90° or 0° to the horizontal. It will be clear that in this manner the sinuosity of the resulting curve of Fig. 3b can be flattened by this means. When the eccentricity between motor shaft 1 and jack shaft 4 is correctly determined, this curve will change approximately into the straight line $g$ shown in Fig. 3c.

A driving mechanism producing a varying angular velocity such as is necessary to obtain a perfectly uniform resulting rotary movement is shown in Figs. 4 and 5, and a modification thereof based upon the same principle in Fig. 6.

The motor shaft 1 and jack shaft 4 are not merely eccentrically mounted, but their axes also enclose a certain angle. A uniformly curved lever 51 secured to the plate 5 mounted upon the jack shaft 4 engages in the slot 52 provided in the plate 2 keyed upon the motor shaft 1. In this form of construction the variation in the angular velocity of the shaft 4 due to the eccentric arrangement of the two axles is also influenced by the fact that the position of the curved pin 51 within the slot 52 automatically varies during each revolution, so that not only the working radii of the driving arm but also of the driven arm are altered periodically during each revolution. By correct choice of the eccentricity, of the center of the curved pin 51 and of the angle enclosed by the axes of the two shafts the variation of the angular velocity which is necessary for obtaining a perfectly uniform resulting rotary movement may be obtained, assuming the connecting rods to be of infinite length.

According to the modification shown in Fig. 6 the slot 52 in the plate 2 is bordered by prismatic ledges 53. A roller 55 rotatably mounted upon a ball 56 in order to be able to move into all directions engages in the said slot. The ball 56 is secured to a fork lever 57 or the like which is pivotally attached to the shaft 4 by means of the bolt 58. According to this construction no sliding friction arises in the slot of the driving plate.

Fig. 5 shows apart from the driving mechanism a modification of the crank gear by means of which the influence of the limited length of the connecting rods upon the resulting movement of the gear is compensated for. In the horizontal channel 20 there is not only guided the rack 19 but also a rail 59 with which the connecting rod 16 is pivotally connected by means of the bolt 17. To the connecting rod 16 there is further rigidly attached a bolt 60 upon which the short connecting rod 61 is rotatably mounted, the other end of this connecting rod being hinged to the rack 19 by means of the bolt 62. If the crank pin 14 is turned from the position I, corresponding to the horizontal position of the crank arm 13, into the position II the rail 59 is accelerated by the continued rotary movement of the driving shaft 8. This acceleration however does not correspond entirely to that of an harmonic movement since it is diminished by the shortening of the horizontal projection of the connecting rod. The converse applies during the movement of the crank pin 14 from the position II to the position III. Here the retardation caused by the progressive rotary movement is not realized in full, since the lengthening of the horizontal projection of the connecting rod gives rise to an acceleration of the rail 59. But as the rack 19 is driven by a second connecting rod 61 it will be accelerated by the shortening of the horizontal projection of this second connecting rod at the same time as the shortening of the horizontal projection of the main connecting rod 16 gives rise to a retardation and vice versa. By the correct choice of the length of the connecting rod 61 an entirely harmonic movement of the rack can be obtained. This harmonic movement is demonstrated in the time velocity diagram by a sinus line which together with the wavy line of the oscillating angular velocity produced by means of the above described driving mechanism can be compounded to form a perfectly straight line. The above-described construction of the crank gear will be employed in connection with a high degree of eccentricity of the crank gear only, since in the case of small degrees of eccentricity the deviation of the movement of the racks from the harmonic movement is but slight.

What I claim is:

1. A gear with gradually and progressively changeable ratio comprising a rotary shaft 8, a set of members adapted to reciprocate at displaced phases, a second shaft 22, a gear adapted to transform the rotary movement of the first shaft into reciprocating movements of the said members, a gear adapted to transform the reciprocating movements of the said members into a rotation of the second shaft, and means for imparting to the first shaft a regularly variable angular velocity so as to obtain an at least approximately uniform angular velocity of the said second shaft.

2. A gear with gradually and progressively changeable ratio comprising a motor shaft 1, a jack shaft 4, a coupling disposed between the said shafts and adapted to impart a regularly varying angular velocity to the said jack shaft, a driving shaft 8, a gear adapted to transmit the rotary movement of the jack shaft to the said driving shaft, a set of members adapted to reciprocate at displaced phases, a gear adapted to transform the rotary movement of the driving shaft into the reciprocating movements of the said members, a shaft 22, and a gear adapted to transform the reciprocating movements of the said members into a rotary movement of the said shaft 22, the number of variations imparted to the angular velocity of the jack shaft multiplied by the ratio of the gear between the said driving shaft and the said jack shaft being equal to the number of phases of the reciprocating movements.

3. A gear with gradually and successively changeable ratio comprising a motor shaft 1, a jack shaft 4 mounted eccentrically thereto, a plate keyed upon one of the said shafts, a radial slot provided in the said plate, a pin secured to the other of the said shafts and adapted to engage in the said slot, a driving shaft 8, a gear adapted to transmit the rotary movement of the jack shaft to the said driving shaft, a set of members adapted to reciprocate at displaced phases, a gear adapted to transform the rotary movement of the driving shaft into the reciprocating movements of the said members, a shaft 22, and a gear adapted to transform the reciprocating movements of the said members into a rotary movement of the said shaft 22, the ratio of the gear between the driving shaft and the jack shaft being equal to the number of phases of the said reciprocating movements.

4. A gear with gradually and successively changeable ratio comprising a motor shaft 1, a jack shaft 4 mounted eccentrically and inclined thereto, a plate keyed upon one of the said shafts, a radial slot provided in the said plate, a pin secured to the other of the said shafts and adapted to engage in the said slot, a driving shaft 8, a gear adapted to transmit the rotary movement of the said jack shaft to the said driving shaft, a set of members adapted to reciprocate at displaced phases, a gear adapted to transform the rotary movement of the driving shaft into the reciprocating movements of the said members, a shaft 22, and a gear adapted to transform the reciprocating movements of the said organs into a rotary movement of the said shaft 22, the ratio of the gear between the driving shaft and the jack being equal to the number of phases of the said reciprocating movements.

5. A gear with gradually and successively changeable ratio comprising a motor shaft 1, a jack shaft 4 mounted eccentrically and inclined thereto, a plate keyed upon one of the said shafts, a radial slot provided in the said plate, a uniformly curved lever secured to the other of the said shafts and adapted to engage in the said slot, a driving shaft 8, a set of members adapted to reciprocate at displaced phases, a gear adapted to transform the rotary movement of the driving shaft into reciprocating movements of the said members, a shaft 22, and a gear adapted to transform the reciprocating movements of the said members into a rotary movement of the said shaft 22, the ratio of the gear between the driving shaft and the jack shaft being equal to the number of phases of the reciprocating movements.

6. A gear with gradually and successively changeable ratio comprising a motor shaft 1, a jack shaft 4 mounted eccentrically and inclined thereto, a plate keyed upon one of the said shafts, a radial slot provided in the said plate, a lever hingedly secured to the other of the said shafts, a ball secured to this said lever, a roller attached to the said ball and adapted to revolve about and to slide upon the said ball and to engage in the said slot, a driving shaft 8, a gear adapted to transmit the rotary movement of the jack shaft to the said driving shaft, a set of members adapted to reciprocate at displaced phases, a gear adapted to transform the rotary movement of the said driving shaft into reciprocating movements of the said members, a shaft 22, and a gear adapted to transform the reciprocating movements of the said members into a rotary movement of the said shaft 22, the ratio of the gear between the driving shaft and the jack shaft being equal to the number of phases of the reciprocating movements.

7. A gear comprising a rotary shaft 8, crank gears, the phases of which are displaced to each other, coupled with the said shaft, plates disposed concentrically to the said shaft, and adapted to be rotated relatively thereto, plane crown threading upon the said plates, the crank pins of the said crank gears being adapted to be adjusted radially and to engage with the said threading, members adapted to be reciprocated by the said crank gears, a second rotary shaft 22, a gear adapted to transform the reciprocating movements of the said members into a rotary movement of the said shaft 22, and means for imparting to the first shaft 8 a regularly varying angular velocity for the purpose of obtaining an at least approximately uniform angular velocity of the said second shaft 22.

8. A gear comprising a rotary shaft, crank gears the phases of which are displaced to each other coupled with the said shaft, plates disposed concentrically to the said shaft connected with one of the said plates, an axle disposed within the said hollow shaft, a coupling between the said axle and the said rotary shaft 8, plane crown threading upon the said plates, the crank pins of the said crank gears being adapted to be adjusted radially and to engage with the said plane threading; members adapted to be reciprocated by the said crank gears, a second rotary shaft 22, a gear adapted to transform the reciprocating movements of the said members into a rotary movement of the said shaft 22, and means for imparting to the first shaft 8 a regularly varying angular velocity for the purpose of obtaining an at least approximately uniform angular velocity of the said second shaft 22.

9. A gear comprising a rotary shaft 8, crank gears the phases of which are displaced to each other coupled with the said shaft, plates disposed concentrically to the said shaft, a hollow shaft connected with one of the said plates, an axle disposed within the said hollow shaft, a coupling between the said axle and the said rotary shaft 8, a steep thread provided on the said axle, a nut seated upon the said thread, means for guiding and means for shifting the said nut axially in the said hollow shaft, plain crown threading upon the said plates, the crank pins of the said crank gears being adapted to be adjusted radially and to engage in the said plane threading, members adapted to be reciprocated by the said crank gears, a second rotary shaft 22, a gear adapted to transform the reciprocating movements of the said members into a rotary movement of the said shaft 22, and means for imparting to the first shaft 8 a regularly variable angular velocity for the purpose of obtaining an at least approximately uniform angular velocity of the said second shaft 22.

10. A gear with gradually and progressively changeable ratio comprising a rotary shaft 8, two crank gears displaced 90° to each other and coupled to the said shaft, two members adapted to be reciprocated by the said crank gears, means for compensating the influence of the limited length of the connecting rods of the said crank gears, a second rotary shaft 22, a gear adapted to transform the reciprocating movements of the said members into a rotary movement of the said second shaft, and means for imparting to the said rotary shaft 8 an angular velocity varying four times during each revolution for the purpose of obtaining a uniform angular velocity of the said second shaft 22.

11. A gear with gradually and progressively changeable ratio comprising a rotary shaft 8, two crank gears displaced 90° to each other and coupled with the said shaft, each of the said crank gears comprising a crank arm, a crank pin and a connecting rod, two members adapted to reciprocate, two auxiliary connecting rods hinged to the said members and to the said connecting rods and adapted to compensate the influence of the limited length of the main connecting rods upon the reciprocating movements of the said members, a second rotary shaft 22, a gear adapted to transform the reciprocating movements of the said members into a rotary movement of the second shaft, and means for imparting to the said rotary shaft 8 an angular velocity varying four times during each revolution for the purpose of obtaining a uniform angular velocity of the said second shaft 22.

12. A gear with gradually and progressively changeable ratio comprising a rotary shaft 8, two crank gears displaced 90° to each other and coupled to the said shaft, each of the said crank gears comprising a crank arm, a crank pin and a connecting rod, two horizontal channels, two racks adapted to slide in the said channels, two racks adapted to slide in the said channels respectively, two rails adapted to slide in the said channels in addition to the said racks and connected to the said connecting rods of the crank gear, two auxiliary connecting rods hinged to the said racks and to the said connecting rods and adapted to compensate the influence of the limited length of the main connecting rods upon the reciprocating movements of the said racks, a second rotary shaft 22, a gear adapted to transform the reciprocating movements of the said racks into a rotary movement of the second shaft, and means for imparting to the said rotary shaft 8 an angular velocity varying four times during each revolution for the purpose of obtaining a uniform angular velocity of the said second shaft 22.

13. A gear comprising a shaft 8, two crank and connecting rod gears having cranks displaced at 90° to each other and coupled to the said shaft, two racks adapted to be reciprocated by the connecting rods of the said crank gears, said connecting rods being articulated to the end of the racks remote from the said shaft 8, a second shaft 22, a set of free wheel pinions adapted to engage with the said racks and to transform their reciprocating movement into a unidirectional movement of the said second shaft, and means for imparting to the said shaft 8 an angular velocity varying four times during each revolution for the purpose of obtaining an at least approximately uniform angular velocity of the said second shaft 22.

In testimony whereof I affix my signature.

WERNER NEURATH.